Figure 1:
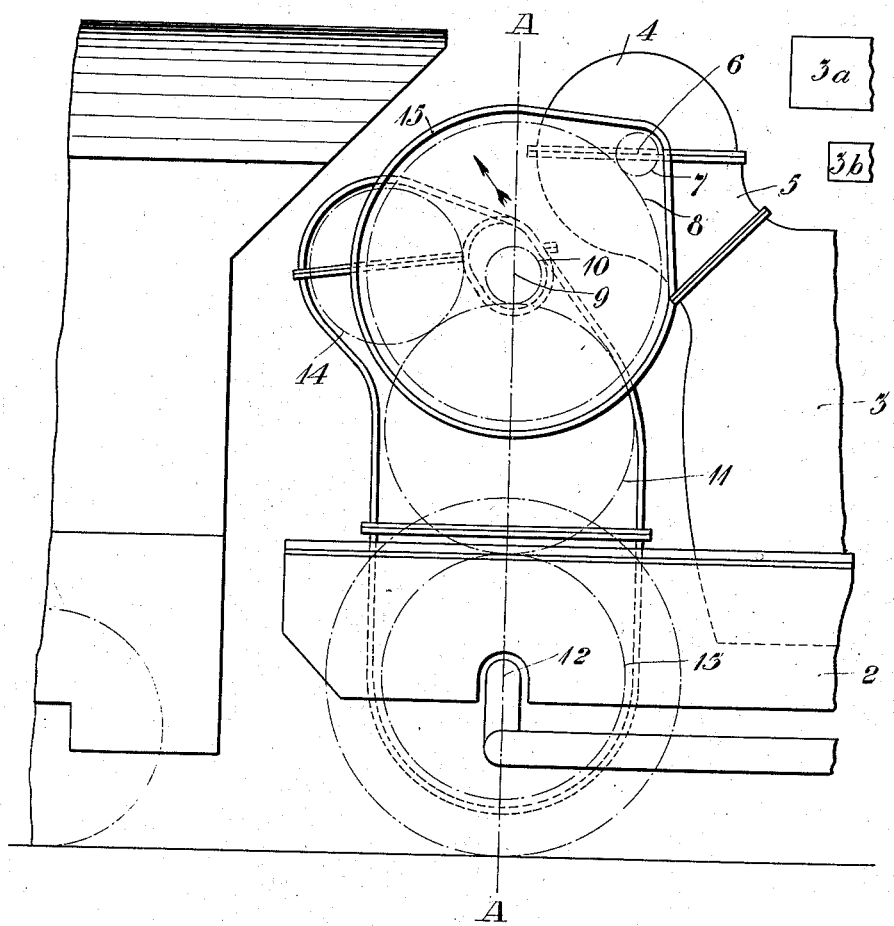

June 14, 1927.

F. LJUNGSTRÖM 1,632,707

TURBINE DRIVEN LOCOMOTIVE AND SIMILAR VEHICLE

Filed April 13, 1922    2 Sheets-Sheet 1

Inventor
F. Ljungström,
By Marks&Clerk
Attys.

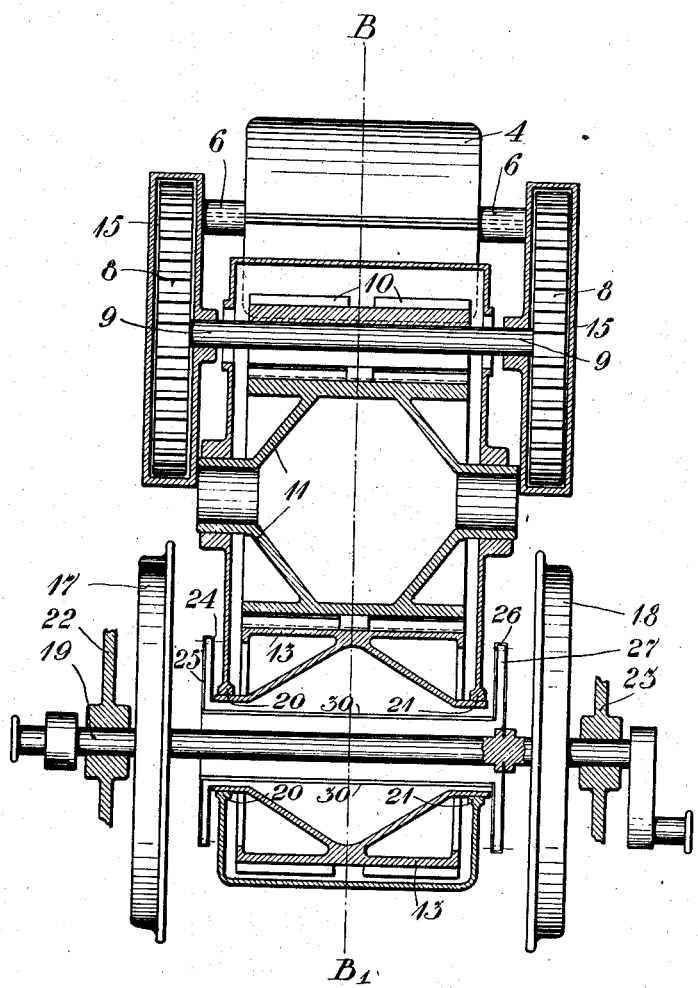

Patented June 14, 1927.

1,632,707

UNITED STATES PATENT OFFICE.

FREDRIK LJUNGSTRÖM, OF LIDINGO-BREVIK, SWEDEN, ASSIGNOR TO AKTIEBOLAGET LJUNGSTRÖMS ÅNGTURBIN, OF STOCKHOLM, SWEDEN, A CORPORATION.

TURBINE-DRIVEN LOCOMOTIVE AND SIMILAR VEHICLE.

Application filed April 13, 1922, Serial No. 552,424, and in Sweden February 17, 1922.

In turbine-driven locomotives, where the power transmission has been effected in a purely mechanical way by means of toothed gearings, it has been proposed, partly to use conical or spiral cut gear wheels in the toothed gearings, and partly to provide the slowest-running shaft of the gearing with cranks, and to transmit the motion to the driving wheels by means of connecting rods. In gearings, and particularly in gearings for the transmission of large amounts of power, conical or spiral cut gear wheels often cause great disadvantages, because such gear wheels give rise to uneven tooth pressures and to oblique forces in the gearing which may be a real danger to the durability of the gearing. When gears other than conical or spiral cut are being used, it is necessary in constructions having only spur wheels, to dispose the steam turbine in the immediate proximity of the toothed gearing, these parts then in their entirety becoming comparatively heavy and requiring for the limiting of the gear pressures to a permissible value, that the wheels of larger locomotives be placed as near as possible to the bearing points of the engine set on the frame which, however, is not feasible in toothed gearings which are connected with the driving wheels only by means of connecting rods.

The present invention relates to a mechanical power transmission for turbine-driven locomotives effected by means adapted to be used in locomotives of all sizes, and the invention consists therein that the turbine is connected to a pair of driving wheels by means of spur gears and by resilient or movable connections, the said pair of driving wheels being, if desired, connected in known manner with other driving wheels by means of the coupling rods. The invention also consists therein that the mechanical power transmitting means comprises, in addition to the speed reducing gear wheels, one or more gear wheels meshing peripherally, in different angular positions, with at least two of the remaining gear wheels of the gearing, in order that the toothed gearing may be given such an extension as to permit of placing the turbine at the necessary level above the frame. Moreover, an elevation in this manner of the speed-reducing part of the toothed gearing effected by the gear serving as a transmission gear only, will have the effect that the whole requisite load-profile may be utilized for the space occupied by the gearing, which space is limited at the bottom by the driving wheels.

The accompanying drawings illustrate an embodiment of a toothed gearing for turbine-driven locomotives arranged according to the invention. Fig. 1 shows an elevation of a locomotive having the turbine and the power transmitting means thereof disposed on a condenser car trailing after the boiler car, the same arrangements, however, being also adapted to be used with other positioning of the turbine set. Fig. 2 shows a section through the toothed gearing on line A—A of Fig. 1.

Situated on the condenser car 2 under the condenser $3^a$, which is cooled by an air draught set up by the fans $3^b$, is an accumulating liquid-container 3 having attached thereto the turbine 4 with its outlet 5. Attached to the shaft 6 of the turbine, on either side of the latter, there are one or more gear wheels 7, driving larger gear wheels 8. The gear wheels 8 are arranged on the same shaft 9 as the smaller gears 10 which drive a transmission gear 11, meshing with the gears 10 and also with the gear wheel 13 attached to the driving shaft 12. Thus the transmission gear 11 does not reduce the speed, but only connects the pinions with the toothed wheel 13. In the drawing, and especially in Fig. 2, the toothed gearing is shown as a double gear, the turbine being provided with toothed gears at both ends, but the arrangements according to the invention may also be employed in toothed gearings wherein the turbine shaft is provided with pinions at one end only. The toothed gearing may also be so arranged as to be double for part thereof only, for instance by providing toothed wheels on both ends of each of the shafts 6 and 9 and making the following wheels, that is, the pinions 10 and the wheels 11 and 13 single, or said latter wheels may be provided with two toothed rims, as will be seen from the drawing, the latter arrangement being particularly suitable when the teeth of the gears are spiral cut. Moreover, there is an additional gear 14 in the toothed gearing for the purpose of effecting reversal, which is obtained by the shaft 9 with the gear wheels pertaining thereto being mounted within a casing 15 which is movably arranged about the turbine shaft 6. In the drawing, the toothed gearing is shown for forward running. For reversal, the casing 15 is swung about the turbine shaft in the direction of the arrow, whereby the gear 10 is brought out of engagement with the transmission gear 11 and, instead, brought into engagement with the reversing gear 14 which is always in engagement with the transmission gear 11. Between the first pair of driving wheels 17—18 and the remaining driving wheels, coupling rods are arranged in known manner.

In Fig. 2, which shows a section of the toothed gearing, the same characters as before denote the same parts. By means of the gears attached to the shaft 6, the turbine drives the gear wheels 8 arranged in the casings 15, said gears 8 being attached to the same shaft 9 as the smaller gear 10 provided with a large toothed rim. The transmission gear 11 is always in engagement with the slowest-running gear wheel 13, and does not effect any change in the speed, but only aids in bringing the upper portion of the gearing so high above the driving wheel that the gearing may be arranged so as to be easily accessible. Otherwise the gear 10 would engage directly into the gear wheel 13, and then a sufficient space between the driving wheels 17 and 18 would hardly be obtained for those parts of the gearing which are located within the casings 15. Moreover, the advantage is obtained, that the turbine will be situated at a level where its position above the liquid-container 3 will make the penetration of the water into the turbine impossible, said liquid-container 3 being adapted to serve in known manner as a steam storer operating under vacuum. At the lower portion of the toothed gearing, the gear wheel 13 is, according to the principle of the invention, resiliently mounted about the driving wheel axle 19, as will be seen from Fig. 2, which construction has been necessitated by the turbine together with the entire mechanical power transmitting means being a resilient load mounted on the frame of the vehicle, while the driving wheels run on the rail without any resiliency, and are subjected to movements, more or less pronounced, relatively to the frame carried by them. For this reason, the gear wheel 13 in 20 and 21 is mounted in the same casing as the remaining gears, whereas the driving wheel axle 19 at 22 and 23 is mounted in devices carrying the frame of the vehicle by means of springs.

The rotary motion of the gear wheel 13 is transmitted to the driving wheel axle 19 through the diaphragms 24 and 25 respectively, the sleeve 30 surrounding the driving wheel axle and extending through a hollow in the gear wheel 13 or the shaft thereof and the diaphragms 26 and 27 respectively, which may be resilient in known manner to allow of angular positions between the driving wheel axle 19 and the gear wheel 13. According to the invention, these diaphragms are situated between the bearings 20 and 22 on the one side, and 21 and 23 on the other side, whereby the advantage is obtained that the bending outwards of the diaphragms on oblique positions of the sleeve 30 will be less than if the diaphragms were placed in some other place between the bearings 20 and 21.

In the embodiment above described, the toothed gearing is arranged with a double reduction of the speed by means of two groups of gear wheels, but embodiments having a plurality of gear wheels for a further reduction of the speed are also conceivable. Then, for instance, a construction for a triple speed reduction will be particularly simplified when the said transmission wheels are being used, because the larger constructions of the gearing are thereby raised beyond the range of action of the driving wheels.

Obviously, further embodiments of the invention may be conceived, without departing from the principle of the invention. The mounting of the turbine and the toothed gearing may be conceived as taking place on the boiler car, in the front part as well as in the rear part thereof. The gearing may also be disposed on the rear part of the condenser car. If the gearing is disposed on a bogie-truck, one of the embodiments described may be used, if only the toothed gearing and the turbine are arranged on this bogie-truck with movable connections with the remaining part of the vehicle, for instance with a resilient exhaust piping to the condenser vessel. Moreover, the gear wheel 13 may be connected with the driving shaft otherwise than by means of a diaphragm device, for example by means of spiral springs, or by claw couplings or other rigid couplings, without departing from the principle of the invention.

What I claim as new and desire to secure by Letters Patent in the United States is:—

1. In a steam-turbine driven vehicle, a transmission gearing, comprising spur gears operatively connected with the turbine, a pair of driving wheels, a shaft for said driving wheels, a sleeve surrounding said driving wheel shaft, a movable coupling comprising two members, the one of which is connected with the slowest running and last gear of said gearing, counted from the turbine, and the other with the sleeve, another coupling comprising two members the one of which is connected with the sleeve and the other with one of the driving wheels, said sleeve extending through said last gear wheel.

2. An arrangement in turbine driven locomotives and similar vehicles, in which the turbine is rigidly connected to the frame of the vehicle, and mechanical power driven means are provided between the turbine and the vehicle driving means comprising toothed gearing enclosed in a casing supported by said frame, and a sleeve surrounding the driving wheel shaft, said sleeve being resiliently connected on the one hand with the toothed gearing, and on the other hand with said driving wheels, the resilient connections between the sleeves and the driving wheel shaft and toothed gearing including diaphragms, one of said diaphragms being connected to the slowest running and last gear wheel of said gearing, counted from the turbine, said sleeve extending through said last gear wheel.

3. In a turbine driven vehicle, a turbine having a shaft, gears on the ends of said shaft, second gears meshing with the first mentioned gears, a second shaft connecting the second gears, a third gear on said last mentioned shaft arranged between the second gears, a fourth gear extending between the second gears and engaging the third gear, a frame supporting the fourth gear, a fifth gear meshing with the fourth gear and rotatably mounted in said frame, a driving wheel shaft, a sleeve surrounding the driving wheel shaft, resilient couplings connecting one end of the sleeve to the fifth gear and the other end of the sleeve to the wheel shaft, and bearings for the driving wheel shaft movable relatively to said frame.

4. In a turbine driven vehicle as claimed in claim 3, a reversing gear permanently meshing with the fourth gear, and means to permit the second shaft to swing for meshing the third gear with the reversing gear.

5. In a turbine driven vehicle as claimed in claim 3, the axes of the second shaft, fourth gear and driving wheel shaft being arranged in a vertical plane.

6. In a steam-turbine driven vehicle, a frame to which the steam turbine is rigidly connected, a transmission gearing comprising spur gears operatively connected with the turbine, a casing supported by said frame and enclosing said gearing, a driving shaft passing through the slowest running gear of the gearing, a pair of driving wheels co-operating with said shaft, and flexible coupling means for connecting said slowest running gear with said driving wheels.

7. In a steam turbine driven vehicle, a frame to which the steam turbine is rigidly secured, a transmission gearing comprising spur gears operatively connected with the turbine, a casing supported by said frame and enclosing said gearing, a driving shaft passing through said casing and through the slowest running gear of the gearing, means permitting movement of said driving shaft in relation to said casing, means journalling said driving shaft in said frame, a pair of driving wheels cooperating with said driving shaft, and flexible coupling means for connecting said slowest running gear with said driving wheels.

8. In a steam-turbine driven vehicle, a frame to which the steam turbine is rigidly connected, a transmission gearing comprising spur gears operatively connected with the turbine, a casing supported by said frame and enclosing said gearing, a pair of driving wheels, a shaft for said driving wheels, a sleeve surrounding said driving wheel shaft and means flexibly connecting said sleeve with said transmission gearing and with said driving wheels.

9. In a steam-turbine driven vehicle, a frame to which the steam turbine is rigidly connected, a transmission gearing comprising spur gears operatively connected with the turbine, a casing supported by said frame and enclosing said gearing, a pair of driving wheels, a shaft for said driving wheels, a sleeve surrounding said driving wheel shaft, means for flexibly connecting one end of said sleeve with the slowest running and last gear of the transmission gearing, counted from the turbine, and the other end with said driving wheels, bearings for said driving wheel shaft, and bearings for the shaft of said last gear, the bearings of said driving wheel shaft and of said shaft of the last gear being movable relatively to one another.

10. In a steam-turbine driven vehicle, a frame to which the steam turbine is rigidly connected, a transmission gearing comprising spur gears operatively connected with the turbine, a casing supported by said frame and enclosing said gearing, a pair of driving wheels, a shaft for said driving wheels, a sleeve surrounding said driving wheel shaft, a flexible coupling connecting said sleeve with the slowest running and last gear of the transmission gearing, counted from the turbine, another flexible coupling connecting said sleeve with the driving wheels, bearings for said driving wheel shaft, and bearings for the shaft of said last gear wheel, each of said couplings being located between a bearing of said driving wheel shaft and a bearing of said last gear wheel shaft.

11. In a steam-turbine driven vehicle, a transmission gearing operatively connected with the turbine, said gearing comprising in addition to speed reducing spur gear wheels at least one spur gear wheel in mesh with at least two of the remaining gear wheels of the gearing, a pair of driving wheels, a shaft for said driving wheels, a sleeve surrounding said driving wheel shaft, and means for movably connecting said sleeve with said transmission gearing and with said driving wheels.

In testimony whereof I affix my signature.

FREDRIK LJUNGSTRÖM.